(12) United States Patent
Ahmed

(10) Patent No.: US 11,593,482 B2
(45) Date of Patent: Feb. 28, 2023

(54) SYSTEMS AND METHODS FOR AUTOMATING DETECTION AND MITIGATION OF AN OPERATING SYSTEM ROOTKIT

(71) Applicant: Saudi Arabian Oil Company, Dhahran (SA)

(72) Inventor: Urfan Ahmed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 3 days.

(21) Appl. No.: 17/192,042

(22) Filed: Mar. 4, 2021

(65) Prior Publication Data
US 2022/0284095 A1 Sep. 8, 2022

(51) Int. Cl.
| G06F 21/00 | (2013.01) |
| G06F 21/56 | (2013.01) |
| G06F 21/54 | (2013.01) |
| G06F 21/55 | (2013.01) |
| G06F 21/57 | (2013.01) |

(52) U.S. Cl.
CPC ............ *G06F 21/565* (2013.01); *G06F 21/54* (2013.01); *G06F 21/554* (2013.01); *G06F 21/564* (2013.01); *G06F 21/568* (2013.01); *G06F 21/577* (2013.01)

(58) Field of Classification Search
CPC .... G06F 21/577; G06F 21/568; G06F 21/564; G06F 21/554; G06F 21/54; G06F 21/565
USPC .......................................................... 726/22
See application file for complete search history.

(56) References Cited

U.S. PATENT DOCUMENTS

| 6,523,141 B1 * | 2/2003 | Cantrill ................. G06F 11/073 717/124 |
| 7,290,175 B1 * | 10/2007 | Kessler ............... G06F 11/0778 714/37 |

(Continued)

FOREIGN PATENT DOCUMENTS

WO 2012027669 A1 3/2012

OTHER PUBLICATIONS

Notification of Transmittal of the International Search Report and the Written Opinion of the International Searching Authority, or the Declaration dated Jun. 7, 2022 pertaining to International application No. PCT/US2022/018080 filed Feb. 28, 2022, 14 pages.

(Continued)

*Primary Examiner* — Josnel Jeudy
(74) *Attorney, Agent, or Firm* — Dinsmore & Shohl, LLP

(57) ABSTRACT

Systems and methods to detect malicious software include an application software repository including a stored header file associated with a driver, an executable, or both, and are operable to (i) receive a memory dump file upon an operating system crash including a driver copy, an executable copy, or both, (ii) verify the memory dump file is new for analysis, (iii) compress the verified memory dump file to generate a memory snapshot of the verified memory dump file, (iv) scan the memory snapshot for a memory dump header file associated with the driver copy, the executable copy, or both, and (v) identify and extract malicious software when the memory dump header file from the memory snapshot fails to match at least one stored header file in the application software repository.

18 Claims, 10 Drawing Sheets

(56) References Cited

U.S. PATENT DOCUMENTS

| | | | |
|---|---|---|---|
| 7,568,233 B1* | 7/2009 | Szor | G06F 21/564 |
| | | | 726/25 |
| 7,571,482 B2 | 8/2009 | Polyakov et al. | |
| 7,921,461 B1 | 4/2011 | Golchikov et al. | |
| 8,856,932 B2 | 10/2014 | Ramalingam | |
| 9,355,247 B1 | 5/2016 | Thioux et al. | |
| 11,301,569 B2* | 4/2022 | Wyatt | G06F 8/61 |
| 2007/0078915 A1 | 4/2007 | Gassoway | |
| 2015/0161414 A1* | 6/2015 | Pandian | H04L 9/0894 |
| | | | 713/189 |
| 2018/0083974 A1* | 3/2018 | Weinstein | H04L 63/1425 |
| 2018/0336085 A1* | 11/2018 | Hammer | G06F 9/45558 |
| 2020/0133761 A1* | 4/2020 | Paruthi | G06F 11/0751 |

OTHER PUBLICATIONS

"Forensic Acquisition and Analysis of Volatile Data in Memory", Jan. 1, 2014, XP055543586, Retrieved from the Internet: URL:https://pdfs.semanticschol.ar.org/da9e/9968b7dc55c016c127c04e5ce88d568644f7.pdf, Paragraphs 2.4,5.1,6.2, 6.3.

* cited by examiner

SYSTEMS AND METHODS FOR AUTOMATING DETECTION AND MITIGATION OF AN OPERATING SYSTEM ROOTKIT

BACKGROUND

The present disclosure relates to automating detection of an operating system rootkit including malicious software and, more specifically, systems and methods for automating detection and mitigation to identify and extract the operating system rootkit.

BRIEF SUMMARY

According to the subject matter of the present disclosure, a rootkit detection system for an operating system to detect malicious software comprises an operating system memory and an operating system data processor device. The operating system memory comprises a malicious software identification and extraction module and an application software repository. The malicious software identification and extraction module comprises machine-readable instructions executable by the operating system data processor device. The application software repository comprises a stored header file associated with a software driver, an executable computer program, or both. The operating system data processor device is communicatively coupled to the operating system memory. The operating system data processor device is operable to execute the machine-readable instructions of the malicious software identification and extraction module to (i) receive a memory dump file upon a crash of the operating system, the memory dump file comprising a copy of the software driver, a copy of the executable computer program, or both, (ii) verify the memory dump file is new for analysis, (iii) compress the verified memory dump file to generate a memory snapshot of the verified memory dump file, (iv) scan the memory snapshot for a memory dump header file, the memory dump header file being associated with the copy of the software driver, the copy of the executable computer program, or both, and (v) identify and extract malicious software when the memory dump header file from the memory snapshot fails to match at least one stored header file in the application software repository.

In accordance with one embodiment of the present disclosure, a rootkit detection system for an operating system to detect malicious software comprises an operating system memory and an operating system data processor device, wherein the operating system memory comprises a malicious software identification and extraction module and an application software repository. The malicious software identification and extraction module comprises machine-readable instructions executable by the operating system data processor device and is associated with a client agent, a server agent, or both, wherein the client agent is communicatively coupled to the server agent. The application software repository comprises a stored header file associated with a software driver, an executable computer program, or both. The operating system data processor device is communicatively coupled to the operating system memory. The operating system data processor device is operable to execute the machine-readable instructions of the malicious software identification and extraction module to (i) receive a memory dump file upon a crash of the operating system, the memory dump file comprising a copy of the software driver, a copy of the executable computer program, or both, (ii) verify the memory dump file is new for analysis, (iii) compress the verified memory dump file to generate a memory snapshot of the verified memory dump file, (iv) scan the memory snapshot for a memory dump header file, the memory dump header file being associated with the copy of the software driver, the copy of the executable computer program, or both, and (v) identify and extract malicious software when the memory dump header file from the memory snapshot fails to match at least one stored header file of in the application software repository. The memory dump file is verified as new for analysis by (i) determination of whether the memory dump file matches an existing memory dump file in a dump repository and (ii) generation of a hash for the memory dump file when the memory dump file does not match the existing memory dump file, the hash being indicative of a verified memory dump file new for analysis.

In accordance with another embodiment of the present disclosure, a method is disclosed for using a rootkit detection system for an operating system to detect malicious software, the rootkit detection system comprising an operating system memory and an operating system data processor device, the operating system memory comprising an application software repository comprising a stored header file associated with a software driver, an executable computer program, or both. The method comprises (i) receiving a memory dump file upon a crash of the operating system, the memory dump file comprising a copy of the software driver, a copy of the executable computer program, or both, (ii) verifying the memory dump file is new for analysis, (iii) compressing the verified memory dump file to generate a memory snapshot of the verified memory dump file, (iv) scanning the memory snapshot for a memory dump header file, the memory dump header file being associated with the copy of the software driver, the copy of the executable computer program, or both, and (v) identifying and extract malicious software when the memory dump header file from the memory snapshot fails to match at least one stored header file in the application software repository.

Although the concepts of the present disclosure are described herein with primary reference to detection of malicious software such as a rootkit, it is contemplated that the concepts will enjoy applicability to any malicious software detection. For example, and not by way of limitation, it is contemplated that the concepts of the present disclosure will enjoy applicability to detection of other malware, firmware, and the like.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein, a malicious software identification and extraction module to implement systems and methods for automating detection and mitigation to identify and extract the operating system rootkit. Such malicious software includes a set of software tools forming malicious software that enable an unauthorized user to gain control of a computer operating system without detection. In embodiments, the malicious software as malicious rootkit software may reside in a kernel of the computer operating system, which is a computer program at the core of and that controls components of the computer operating system. As non-limiting examples, the kernel connects an application software of the computer operating system to computer operating software or hardware, such as a central processing unit, a memory, or other computer devices.

The computer operating system may further include a driver kit containing header files (e.g., ".h files") to build kernel-mode and user-mode drivers. The computer operating system may further include executable files as executable computer programs, which are files used to perform various computer functions or operations, drivers, or combinations thereof. Such drivers include a set of files as a software component configured to communicate with and inform an end component such as hardware, or software such as operating system software (e.g., core operating system data structures accessed by code running in kernel mode), how to function by communication with the computer operating system. Thus, an application on the computer operating system may request reading data from the end component. The application may call a function implemented by the operating system to communicate with one or more software drivers, communicating between the operating system and the end component, to call another function implemented by the software drivers to communicate with the end component to retrieve the requested data. A component presenting such an interface and running a user mode may be an application, and a component running in kernel mode (e.g., to access core operating system data structures) may be a software driver. The software drivers may further include driver header files to declare interfaces between parts of the computer operating system to invoke system calls and libraries. In embodiments described herein, the malicious software identification and extraction module to implement systems and methods for automating detection and mitigation to identify and extract the operating system rootkit causing a crash of a computer operating system via memory dump analysis of software header files during the crash, as described in further detail below.

Figure 1:
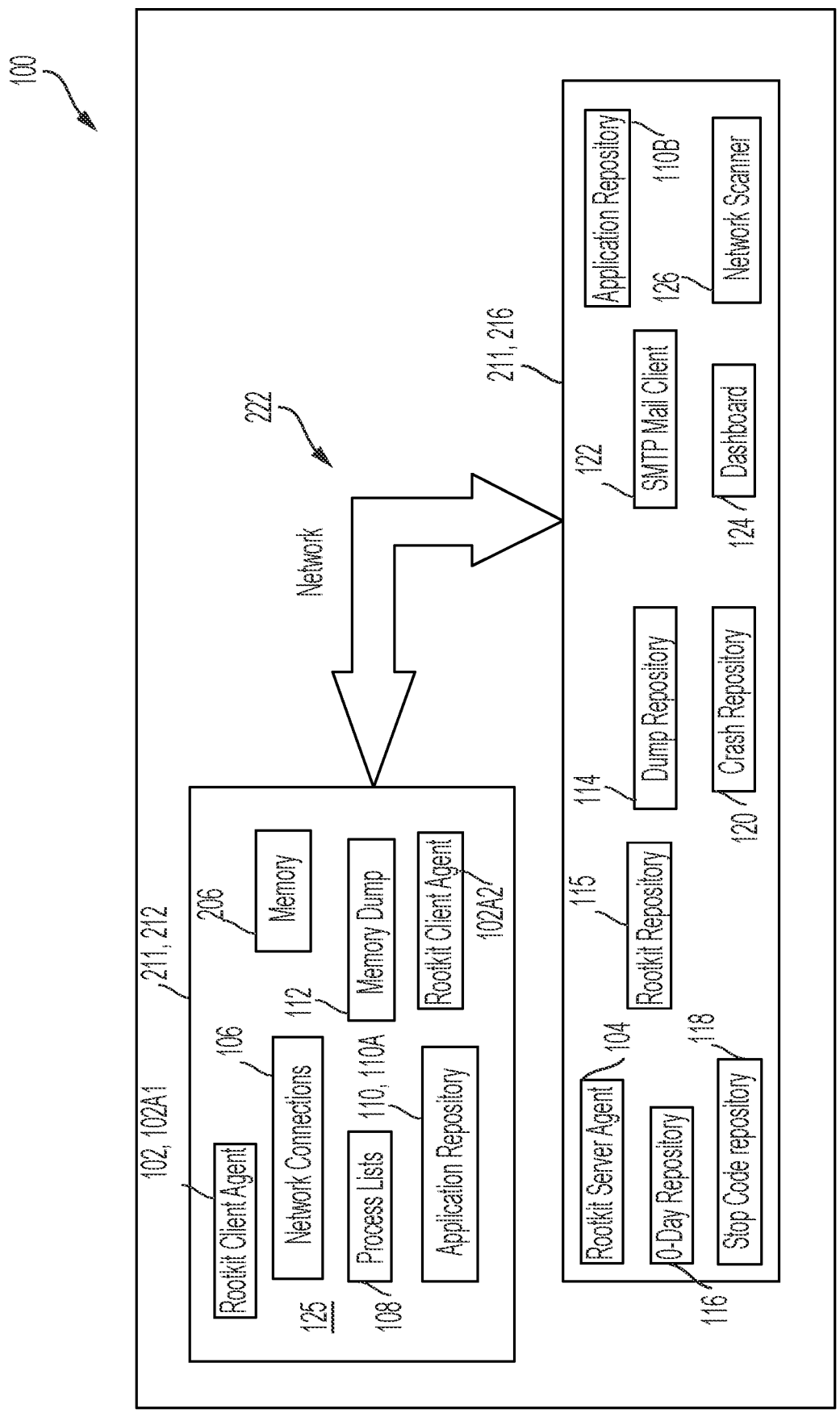
FIG. 1 schematically illustrates a malicious software identification and extraction system including a root client agent and a root server agent, according to one or more embodiments shown and described here.

Referring initially to FIG. 1, an embodiment of a malicious software identification and extraction system 100 is depicted. The malicious software identification and extraction system 100 includes a malicious software identification and extraction module 211. The malicious software identification and extraction module 211 may include a rootkit client agent 102 and a rootkit server agent 104 (e.g., also referred to as a client agent 102 and a server agent 104 herein). The rootkit client agent 102 may include one or more rootkit client agents 102A1, 102A2. The rootkit client agent 102 may include program code that sits on one or more target machines to communicate with and execute commands from the rootkit server agent 104. The rootkit server agent 104 may include program code that sits on one or more server machines to communicate with the rootkit client agent 102. As a non-limiting example, the rootkit client agent 102 may be associated with a client-agent based module 212, and the rootkit server agent 104 may be associated with a server-agent based module 216. The client-agent based module 212 may be communicatively coupled to the server-agent based module 216 via a network 222.

In embodiments, the client-agent based module 212 includes and communicatively couples rootkit client agents 102A1, 102A2, one or more network connections 106, process lists 108, an application software repository 110 such as client application software repository 110A, a memory dump 112, an operating system 125, and a memory 206. The server-agent based module 216 may include and communicatively couples the rootkit server agent 104, an application software repository 110B, a dump repository 114, a rootkit repository 115, a zero day ("0-Day") repository 116, a stop code repository 118, a crash repository 120, a simple mail transfer protocol ("SMTP") mail client 122 including a communication protocol for electronic mail submission, a dashboard 124, and a network scanner module 126. It is to be understood that the one or more components of either the client-agent based module 212 or the server-agent based module 216 may be interchangeable and disposed on either module 212, 216 within the overall malicious software identification and extraction module 211.

As a non-limiting example, a computing device 224 (FIG. 2) may include and act as the rootkit client agent 102 or rootkit server agent 104. In embodiments, the rootkit server agent 104 on a computing device 224 may be communicatively coupled to one or more rootkit client agents 102, 102A1, 102A2 of one or more other computing devices 224 to respectively receive information therefrom and transmit information thereto. The operating system 125 may be installed on and associated with one or more computing devices 224 (FIG. 2) including the client-agent based module 212, the server-agent based module 216, or combinations thereof.

The network connections 106 may include one or more wired or wireless connections via a network interface hardware 218 (FIG. 2) configured to connect to and communicatively coupled with the network 222. The network 222, described in greater detail below with respect to FIG. 2, may include a group of computing devices 224 that use a set of common protocols to communicate with each other over a digital medium, such as over an ethernet network using TCP/IP, which is an internet protocol suite including Transmission Code Protocol and Internet Protocol and is representative of a set of rules governing a connection of computer systems to the internet. The network scanner module 126 may include a tool configured to diagnose and investigate what machine ports are open, closed or in a filtered state using either TCP or UDP as a protocol. An example of the network scanner module 126 can be a network scanner tool such as NMAP developed by Gordon Lyon.

The process lists 108 may be associated with an instance of a computer program that is being executed by one or many threads as understood to one of ordinary skill in the art. Such process lists 108 may contain program code used to execute within a computer system of the computing device 224 to perform a task.

The application software repository 110 may be configured to sync with a server 220 using a network 222. The application software repository 110 may further be configured to store dates, applications/kernel driver names, machine name, process names, file locations, certification names (such as of a signed app/kernel driver), and kernel driver object names. The application software repository 110A is associated with and sits on the rootkit client agent 102.

The memory dump 112 in an aspect is associated with a file that is created by the operating system 125 whenever the operating system 125 generates a crash screen upon a system crash of the computer device 224, such as what may be referred to as a blue screen of death ("BSOD"). The operating system 125 may be a WINDOWS operating system as provided by the MICROSOFT Corporation of Seattle, Wash. The operating system 125 may be configured to automatically generate a file called "memory.dmp" as a memory dump file in a file location, such as a c:\windows folder of the WINDOWS operating system. Such a memory dump 112 is representative of a recorded state of a working memory of one or more computer programs at a time, such as the time when the one or more computer programs have crashed or otherwise abnormally terminated (e.g., upon an operating system crash). While the memory dump 112 may be configured to include a full dump, a partial dump, of the memory 206 of the operating system 125, embodiments herein are generally directed to generation of the memory dump file as a full dump upon the system crash. The memory 206 may refer to a device used to store information for computing purposes, which may be volatile or non-volatile, and is part of a computer system. Memory dumps 112 associated with the memory 206 can be analyzed using applications such as WINDGB, which is a multipurpose debugger tool for the WINDOWS operating system developed by Microsoft Corporation of Redmond, Wash.

The dump repository 114 may be configured to store memory dumps 112, memory snapshots, hashes, compressed files, dates, machine name, process lists 108, network lists, stop codes and associated priority information, and the like. Such memory snapshots may include a complete dump of the contents of the memory 206 upon a crash, and a tool such as volatility may be used to analyze such memory snapshot dumps, as described in greater detail further below. The 0-Day repository 116 may be configured to store machine name, the memory dump 112, the hash, date time of the crash, the stop codes and associated priority information, and the like. The rootkit repository 115 may be configured to store machine name, the memory dump 112, the hash, a date and time of the crash, the stop codes and associated priority information, and the like.

The stop code repository 118 may be a database that contains different stop codes (e.g., generated from a memory dump 112) that are represented by a hexadecimal number.

The stop code repository 118 may include directly mapped codes to identify kernel security errors, operating system errors, 0-day/Application related errors (that force a kernel of the operating system 125 to crash), and other system based errors. The crash repository 120 may be configured to store a machine name and associated information upon a crash, such as the memory dump 112, the hash, date time of the crash, the stop code and associated priority information, and the like. The rootkit repository 115 may be configured to store the name of the machine, the missing port numbers, the date time and the source and destination of the network connections 106, memory dumps 112, stop codes and associated priority information, and the like. The missing port numbers may be ports that do not match a scan of local Transmission Control Protocol (TCP) and User Datagram Protocol (UDP) ports using the systems and methods herein as described in greater detail further below.

The SMTP mail client 122 may be a mail client configured to send an email based alert to the list of predefined email addresses. The dashboard 124 may be a graphical user interface ("GUI") configured to represent unified data about an analysis conducted by the rootkit server agent 104. The analysis may include findings of a memory dump analysis for the operating system 125, information from the 0-Day repository 116 and/or the application software repository 110, rootkit crash information and other findings. The analysis may categorize such crashes and findings in order of severity (e.g., high, medium, low) based on the number of machines that repeatedly crash. As a non-limiting example, if a machine repeatedly crashes, a priority associated with the machine will be increased in ranking and level of severity.

Figure 2:
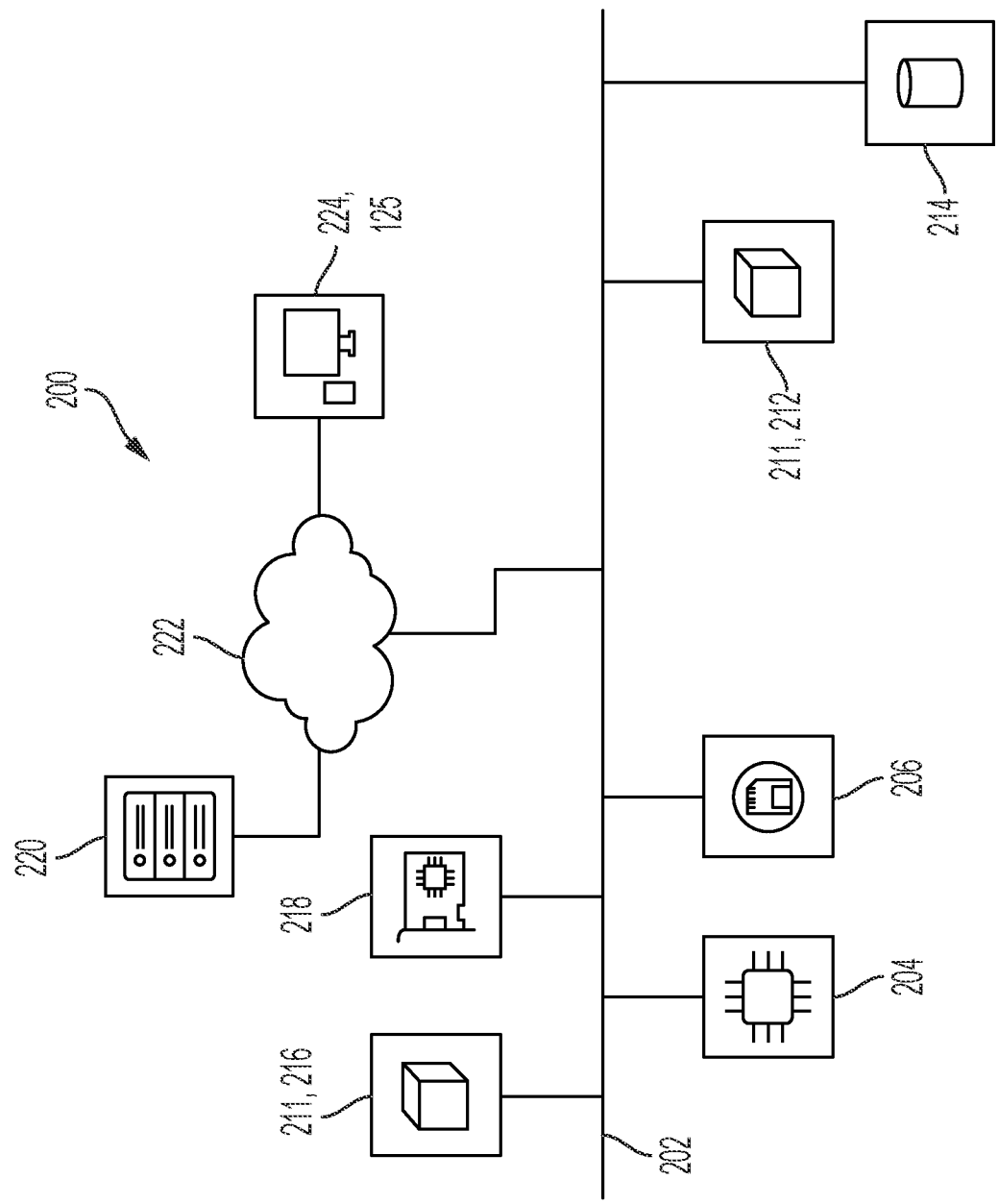
FIG. 2 schematically illustrates a rootkit detection system for use with the malicious software identification and extraction system of FIG. 1 and processes described herein such as in FIGS. 3-6 below, according to one or more embodiments shown and described herein.

FIG. 2 illustrates a computer implemented embodiment of a rootkit detection system 200 for use with the malicious software identification and extraction system 100 of FIG. 1 and one or more processes described herein, such as with respect to FIGS. 3-6 and in greater detail further below. As depicted, the rootkit detection system 200 includes a communication path 202, one or more processors 204, the memory 206, the malicious software identification and extraction module 211, the client-agent based module 212, a storage or database 214, the server-agent based module 216, the network interface hardware 218, the server 220, the network 222, a computing device 224, and the operating system 125, which are described in greater detail further below with reference to FIG. 2. The memory 206 may be an operating system memory as described herein, and the computer device may include the rootkit client agent 102, the rootkit server agent 104, or combinations thereof.

Figure 3:
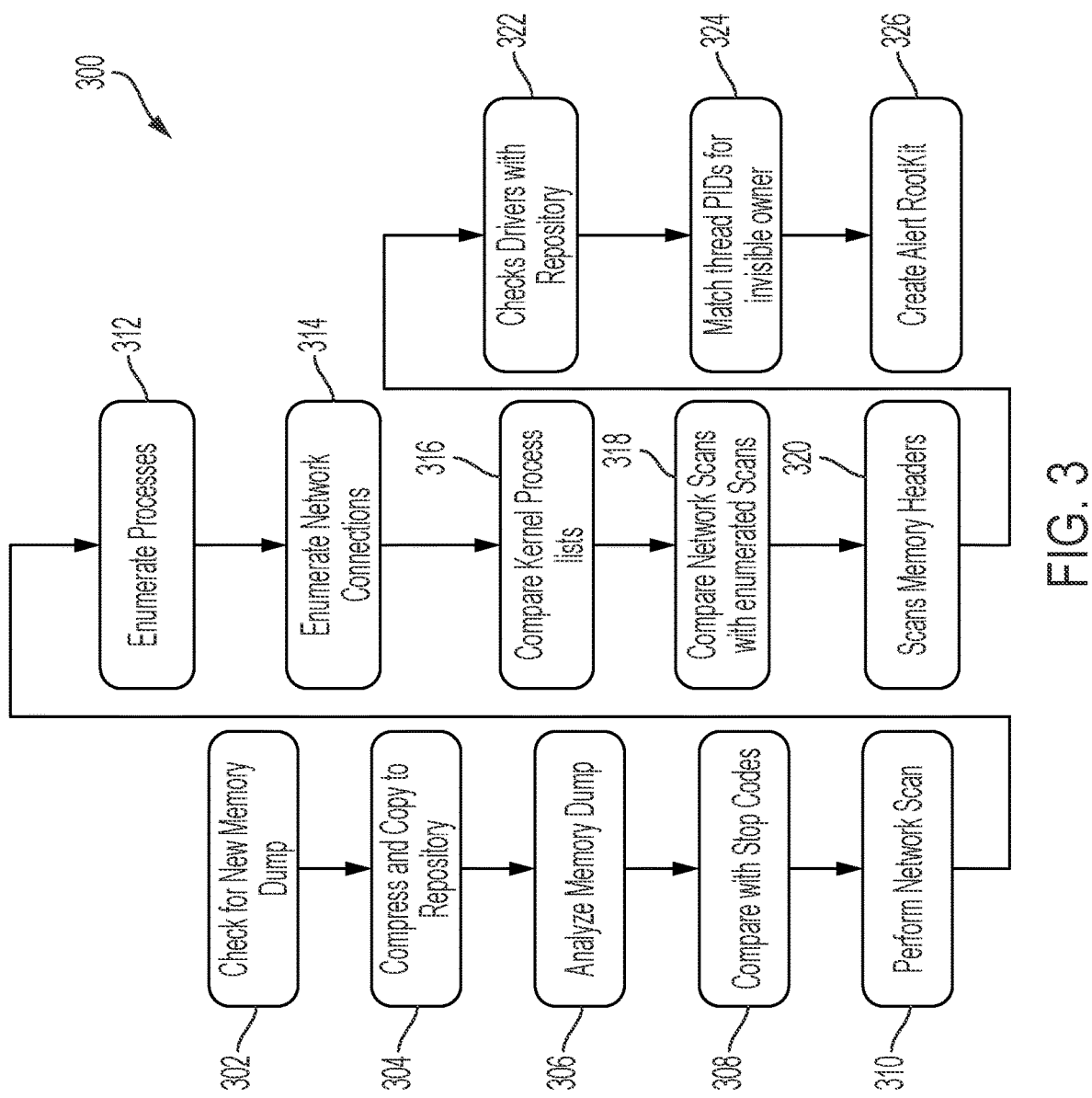
FIG. 3 illustrates a flowchart of an enumeration process to use with the rootkit detection system of FIG. 2, according to one or more embodiments shown and described herein.

Referring to FIG. 3, a process 300, which may be an enumeration process, is shown to use with the rootkit detection system 200. An expanded description with respect to the process 300 not setting forth specific enumeration is described below with respect to a process of 600 of FIG. 6. In block 302 of FIG. 3, the process 300 checks the operating system 125 for a new memory dump 112, and in block 304 compresses and copies the new memory dump 112 to the application software repository 110. In block 306, the compressed new memory dump 112 in the application software repository 110 is analyzed to generate one or more stop codes.

In block 308, generated one or more stop codes from the compressed new file dump 112 are compared to one or more stop codes known and stored, such as in the stop code repository 118. A memory dump stop code from the memory dump file may be compared to a plurality of stored stop codes in the stop code repository 118. In block 310, the process 300 performs a network scan of a host (e.g., the client agent 102) via, for example, the network scanner module 126. A network scan of the client agent 102 may be performed to generate a plurality of scanned network connections 106 when the memory dump stop code fails to match at least one stored stop code of the plurality of stored stop codes in the stop code repository 118.

In block 312, one or more process lists 108 are enumerated such that a complete and ordered listing of all the items in a collection of the process lists 108 is generated. Such an enumeration may occur through application of an enumeration function to the one or more process lists 108. An enumeration function may be applied to the memory dump file to generate a list of enumerated processes. In block 314, the one or more network connections 106 are enumerated. The enumeration function may be applied to the memory dump file to generate a list of enumerated network connections. In block 316, the one or more process lists 108 from the kernel are compared against the enumerated one or more process lists from block 312. A plurality of stored kernel process lists may be compared to the list of enumerated processes. In block 318, the one or more scanning network connections (e.g., the network connections 106) are compared against the one or more enumerated network connections. The plurality of scanned network connections may be compared with the list of enumerated network connections.

In block 320, memory headers are scanned from the memory dump 112 via the network scanner module 126. In block 322, software drivers are checked against authorized software drivers stored in the application software repository 110. In block 324, enumerated owner process of all threads (e.g., thread process identifiers as thread "PIDs") are matched to identify one or more invisible owners, the one or more invisible owners corresponding to one or more rootkit detections.

A process may be associated with a unique identifier referenced as a process identifier (PID), and the PID may be associated with one or threads having thread PIDs. A thread ID of an initial thread associated with the process is equivalent to the PID of the entire process. Thread IDs for subsequently created threads associated with the process are distinct. The enumeration function may be applied to a plurality of thread identifiers associated with a corresponding plurality of process identifiers from the list of enumerated processes. An enumerated process that is invisible may be identified when the enumerated process fails to match at least a stored kernel process list of the plurality of stored kernel process lists. The malicious software may be identified based on the enumerated process that is invisible. In block 326, an alert is generated based on the rootkit detection, which is stored in the rootkit repository 115 or in the 0-Day repository 116. The generated alert may thus be based on the identified malicious software. In embodiments, if a rootkit is found and classified as a rootkit, the rootkit is stored in the rootkit repository 115. However, if a program crashes due to memory error, the malicious software may be classified as a 0-day that is found and is stored in the 0-day repository 116. A 0-day vulnerability may be described as a computer-software vulnerability, such as of an application code of an application (i.e., a software application), that has not yet been discovered for mitigation or mitigated such that no patches or mitigation yet exist. Such 0-days as malicious software may be used in Trojan horses, rootkits, viruses, worms, and other types of malware. In embodiments, malicious software as identified herein may be indicative of discovery of a vulnerability in an application code of an application of the operating system 125 based upon the crash, such as when the crash is due to a memory error and the vulnerability of the application code of the application is a 0-day for storage in the 0-day repository 116. The rootkit repository 115, the 0-day repository 116, or both with an enumerated network connection indicative of a missing port may be updated when the enumerated network connection fails to match at least one scanned network connection of the plurality of scanned network connections.

Figure 4A:
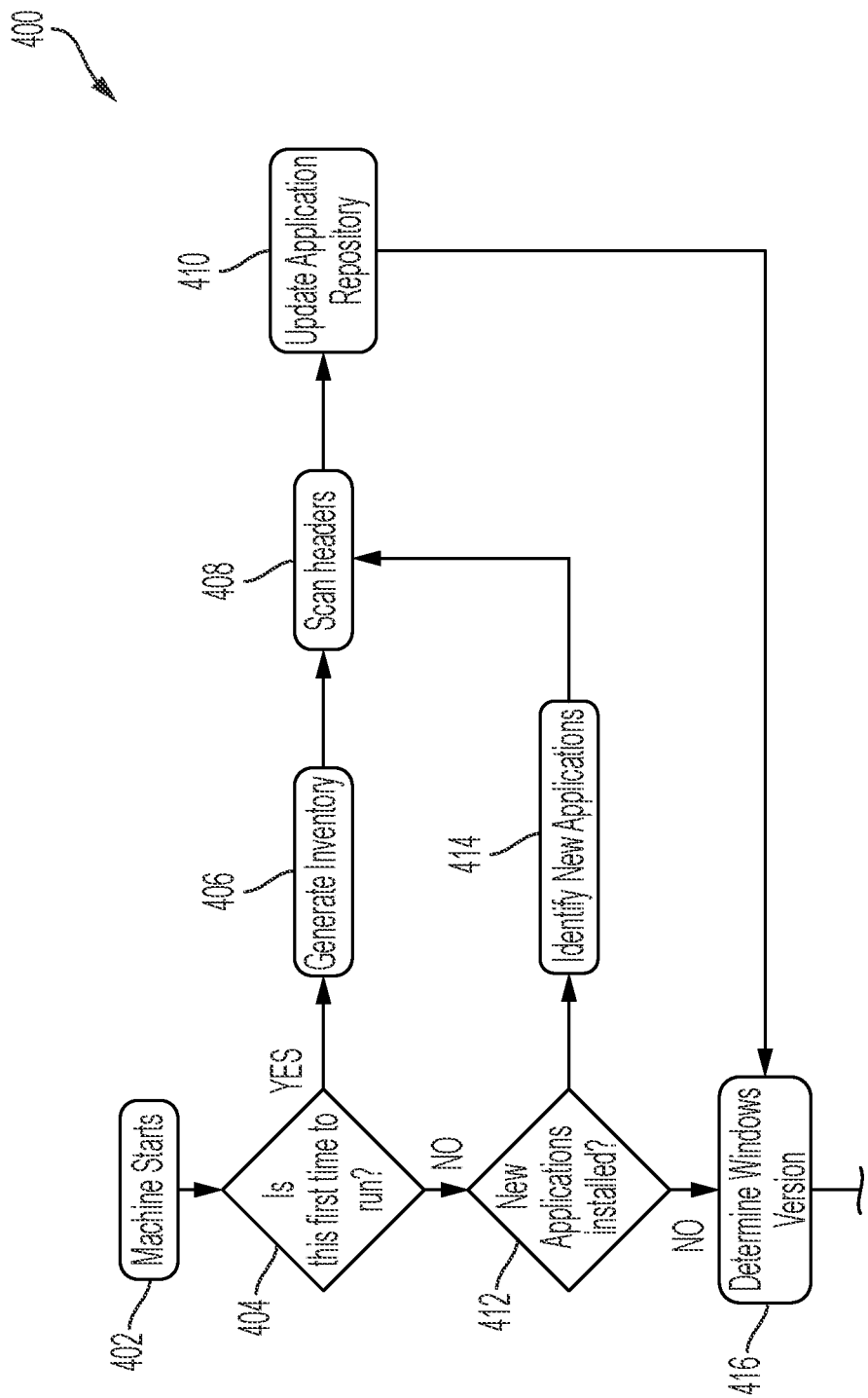
FIG. 4A illustrates a first part of a flowchart of a process to use with the root client agent of FIG. 1 and the rootkit detection system of FIG. 2, according to one or more embodiments shown and described herein.

Referring to FIG. 4A, a first part of a process 400 to use with the rootkit client agent 102 and the rootkit detection system 200 is shown. In block 402, a machine starts from a power off state, such as computing device 224 hosting the client agent 102. Thus, the client agent 102 may be started from the power off state.

In block 404, the process 400 determines whether the machine is being run for the first time. If so, the process 400 continues on to block 406, and if not, the process continues on to block 412. In block 406, an inventory is generated as a new inventory when the machine is determined as being run (e.g., started or reinstalled after a complete reset) for the first time. The rootkit detector agent may generate the inventory of applications/drivers by enumerating names, process names, file locations, certification names (of signed app/kernel drivers), and kernel driver object names. Once completed, header files are scanned from the inventory in block 408 as described herein. In block 410, the application repository 110 is updated with the scanned header files. The application repository 110 may be updated with the date of the first time the agent was run, and the applications/kernel driver names, process names, file locations, certification names (of a signed app/kernel driver), and kernel driver object names.

In block 412, the process 400 determines whether new applications are installed when the machine is determined as not being run for the first time. A new inventory is created from and of existing applications/drivers and checked against the application repository 110 to determine whether there is a match. A match failure leads the process 400 to block 414, while a match success leads the process to block 416. In block 414, the new applications are identified when the process 400 determines new applications are installed in block 412 based on the match failure. Header files from the new applications of block 414 may be scanned in block 408, such that new applications/drivers are enumerated, and added to the application repository in block 410. In block 416, a version of the operating system 125 is determined when the process 400 determines new applications are not installed in block 412 based on the match success or once the application repository 110 has been updated in block 410.

Figure 4B:
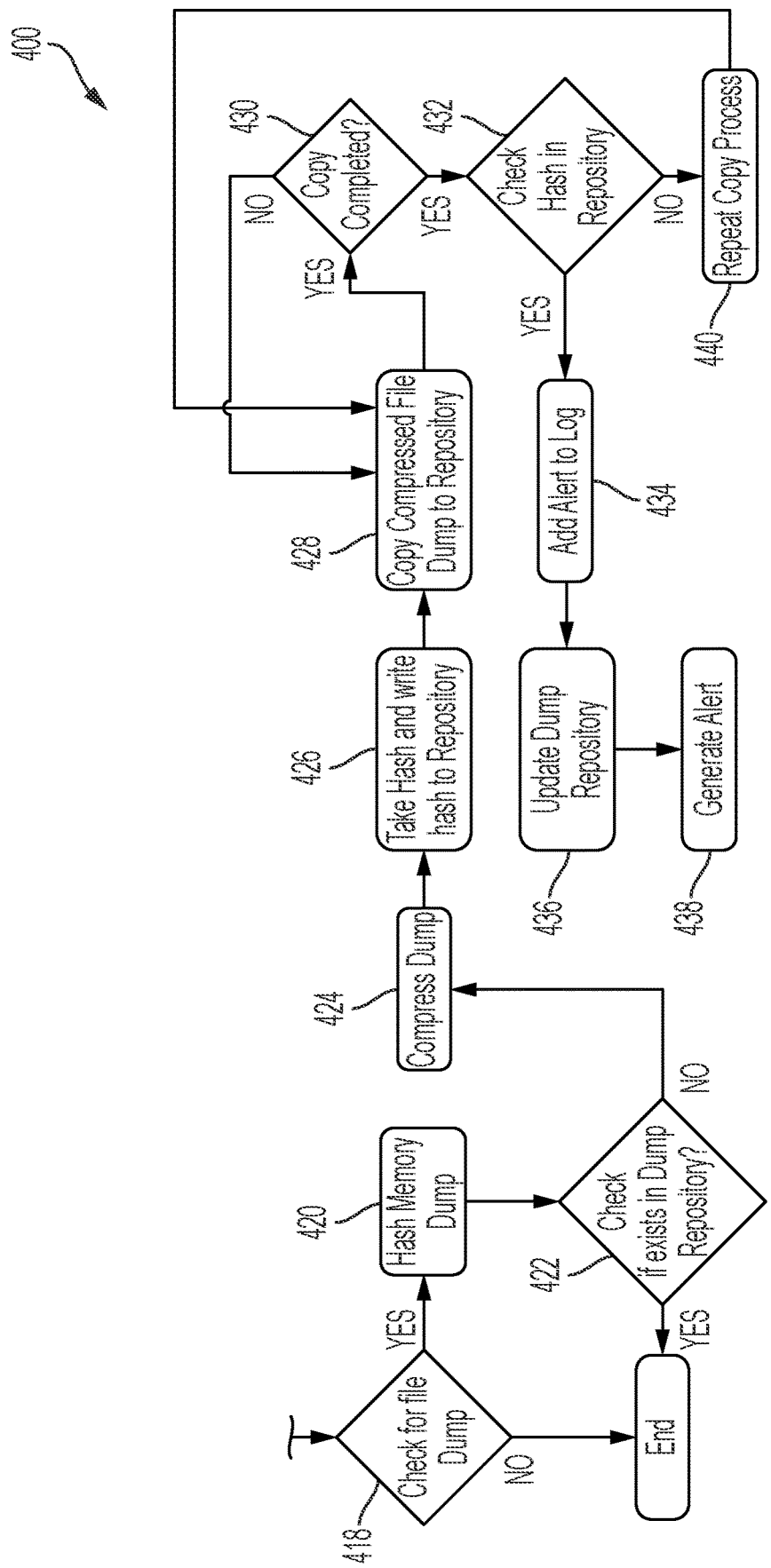
FIG. 4B illustrates a second part of the flowchart continuing from FIG. 4A, according to one or more embodiments shown and described herein.

Referring to FIG. 4B, a second part of the process 400 continuing from the first part of FIG. 4A is shown. In block 418, a file dump check to determine whether a memory dump 112 is generated is performed. The process 400 checks if a memory dump 112 exists in a memory dump file location.

In response to a negative confirmation in block 418, the process 400 ends. In response to a positive confirmation in block 418 that a memory dump 112 is found, a hash of the memory dump 112 is performed in block 420. The memory dump 112 may be hashed using a cryptographic algorithm (e.g., a "crypto algorithm" such as a SHA-256 cryptographic hash algorithm, which generates an almost-unique 256-bit signature for a text, hereinafter "sha256"). In block 422, the process 400 checks whether the hash of the memory dump 112 exists in the dump repository 114. The hash may be checked against the dump repository 114 for a match. If the match exists, the process 400 ends. If not, the memory dump 112 is compressed in block 424 (using as a non-limiting example a compression algorithm such as 0.7z or RAR as understood to those of skill in the art), and the hash is written to the dump repository 114 in block 426. In block 426, a hash of the compressed memory image may be made using the crypto algorithm (e.g., sha256).

In block 428, the compressed file dump is copied to the dump repository 114. A compressed image of the memory dump may be copied to the dump repository 114 with the corresponding machine name, the date time of the memory file create date, and its hash. In block 430, the process 400 determines whether the copying is completed, returning to block 428 until completed. The copy process may be checked periodically, such as every three minutes, to determine if it is completed. Upon completion, the process 400 continues on to block 432 to check whether the hash is in the dump repository 114. The copied filed in the dump repository 114 may be hashed using the crypto algorithm and checked against an existing hash of an original file to determine whether there is a match. If not (e.g., no match), the process 400 continues to block 440 (e.g., finding the copied memory dump 112 had errors) to repeat the copy process between blocks 428, 430, and 432 until the hash is in the dump repository 114 (e.g., without error). If so (e.g., a match is found), an alert of the hash being added the dump repository 114 is added to the log in block 434. In block 434, the local logs may be updated with an alert to indicate a new memory dump 112 is ready to be analyzed. The dump repository 114 is updated in block 436. The dump repository 114 may be updated with the time/date of the new alert and the memory dump 112 flagged as successfully copied without errors. In block 438, the alert is generated such as by the rootkit client agent 102 to the rootkit server application (e.g., the rootkit server agent 104).

Figure 5A:
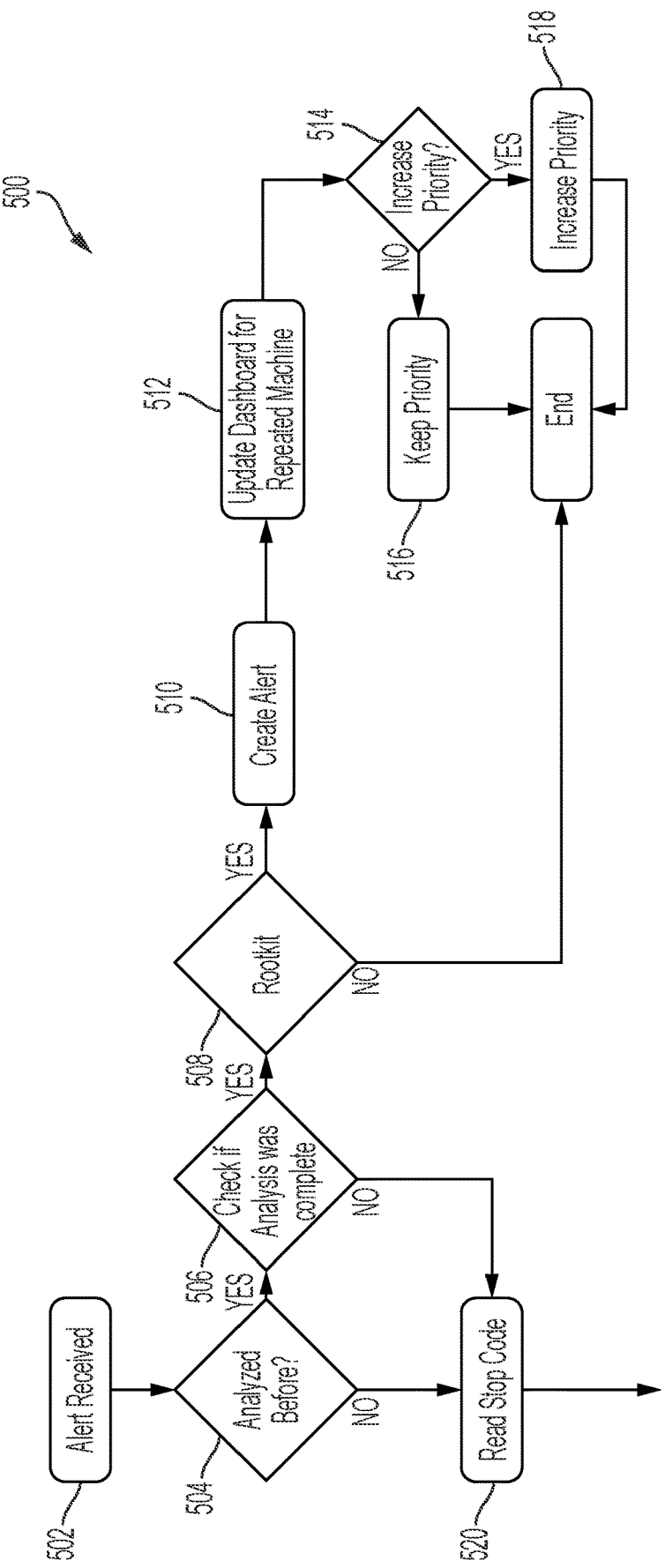
FIG. 5A illustrates a first part of a flowchart of a process to use with the root server agent of FIG. 1 and the rootkit detection system of FIG. 2, according to one or more embodiments shown and described herein.

Referring to FIG. 5A, a first part of a process 500 to use with the rootkit server agent 104 and the rootkit detection system 200 is shown. In block 502, a generated alert (such as from the client agent 102 as generated in block 438 of FIG. 4B) is received at the rootkit server agent 104 to indicate a new memory dump 112 is ready for analysis. The process 500 may determine whether the memory dump file matches an existing memory dump file in the dump repository 114. In block 504, the process 500 determines whether the components included in the alert have been analyzed before. A hash for the memory dump file may be generated when the memory dump file does not match the existing memory dump file, and the hash may be compared against an existing hash in the dump repository 114 to verify the memory dump file is new for analysis when the hash does not match the existing hash. Thus, the hash of the new memory dump 112 and machine name may be checked against the dump repository 114 to determine whether the analysis occurred before. If so, the process 500 advances to block 506, otherwise the process 500 advances to block 520.

Thus, if the process 500 determines in block 504 the components included in the alert have been analyzed before, the process 500 continues on to block 506 to check whether the analysis had been completed. An analysis flag in the dump repository 114 may be checked to determine whether the analysis was completed. Upon determining the analysis had been completed, the process 500 determines whether an identified rootkit is retrieved as a re-identified rootkit (e.g., via a corresponding hash identification and match) in block 508. The rootkit repository 115 may be checked with the hash of the memory dump 112 (and the machine name) to see if the hash exists.

If not, the process 500 ends. If so, in block 510, an alert of the re-identified rootkit is generated. The alert may be created to indicate that a machine that has a rootkit has crashed again, and the rootkit repository 115 may be updated with a number of times the alert has been issued. In block 512 the dashboard 124 is updated for a repeated machine. The dashboard 124 may be updated with a number of times the machine was flagged for analysis (more than once indicating the repetition of the machine crashing to be identified as a repeated machine). The repeated machine may be a computing device 224 from and on which the re-identified rootkit is detected to indicate the machine is repeated the rootkit causing the repeated system failure on the machine. In block 514, the process 500 determines whether to increase priority with respect to the repeated machine to address system issues. A priority level number may be checked against a threshold of high, medium, or low values to determine whether to change the priority level. If no, such that a number of crashes for the machine does not exceed any priority numbers, the current priority of the repeated machine is kept in block 516, and the process 500 ends. If yes, the priority level of the repeated machine is increased such as to a next level in block 518, and the process 500 ends.

In block 504, if the process 500 determines the components included in the alert have not been analyzed before, or in block 506 upon determining an analysis of a previously analyzed alert had been completed, the process 500 continues on to block 520 in which the stop code is read. In block 520, the memory dump 112 may be uncompressed and a relevant stop code read from the memory dump 112. An alert for the server agent 104 communicatively coupled to the client agent 102 may be generated so that the verified memory dump file is ready for analysis, the alert including an identified stop code. The alert may be received at the server agent 104 associated with the stop code repository 118 including one or more existing stop codes.

Figure 5B:
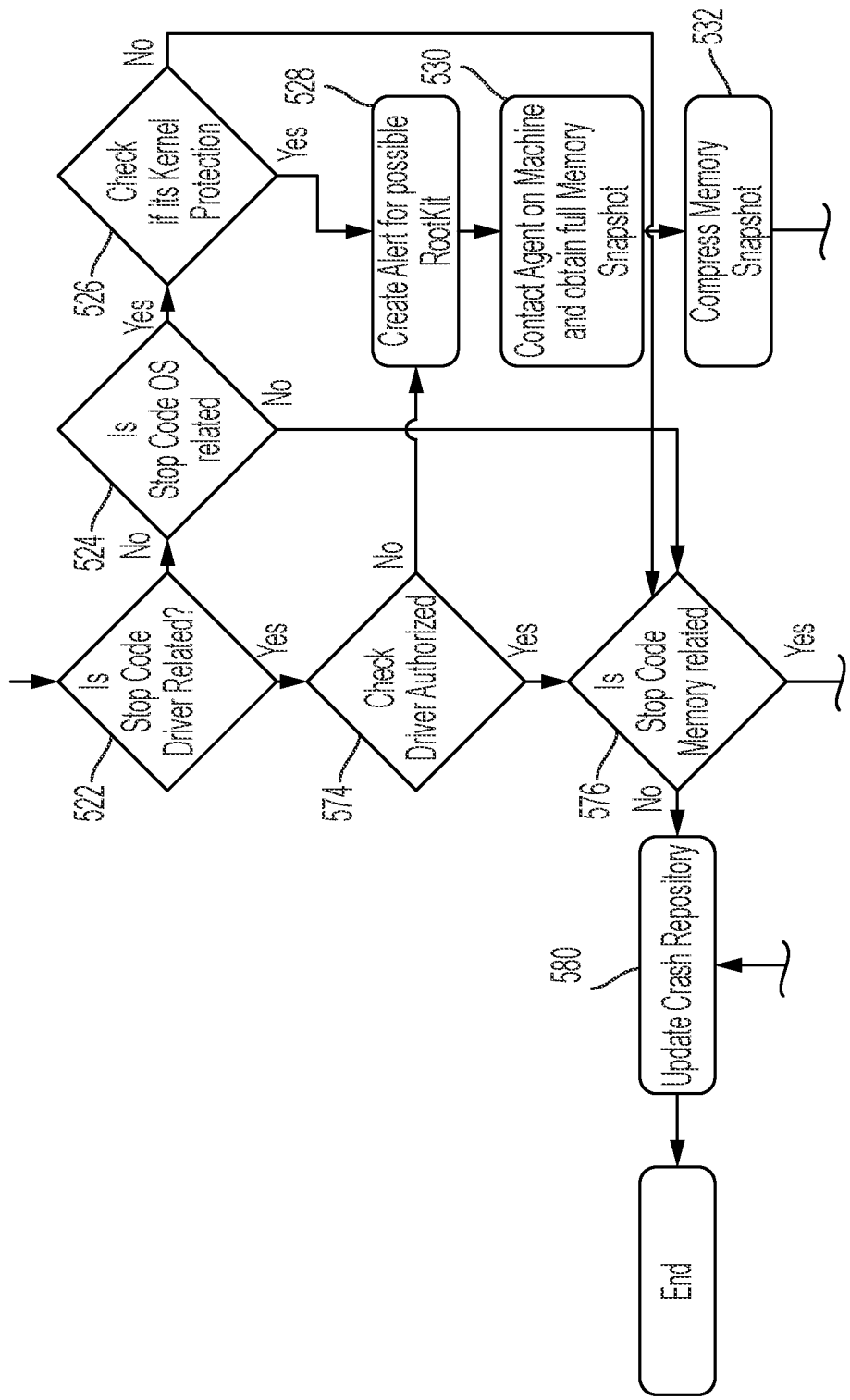
FIG. 5B illustrates a second part of the flowchart continuing from FIG. 5A.

Referring to FIG. 5B, a second part of the process 500 continuing from the first part of FIG. 5A is shown. In block 522, continuing from block 520 in FIG. 5A, the process 500 determines whether the stop code is driver related. A check may be made to determine whether the stop code is kernel driver related for a kernel by comparing a stop error number against a list of error codes related to the kernel from the stop code repository 118. If not found to be driver related, the process 500 determines in block 524 whether the stop code is operating system related. The stop code may be checked against the stop code repository 118 to verify whether the stop code is an operating system error. If so (e.g., found to be operating system related), the process 500 determines whether the stop code is related to kernel protection in block 526 (otherwise the process 500 moves to block 576 described below). The stop code may be checked against the stop code repository 118 to verify whether it is representative of a control flow guard, or an equivalent in an operating system 125 such as WINDOWS 10, which acts as a self-defense mechanism when it detects a kernel anomaly. If related to kernel protection, the process 500 moves to block 528, and an alert for a possible rootkit is generated (otherwise the process 500 moves to block 576 described below). In block 528, the alert may be written to logs to indicate a possible rootkit detection, the machine name, and a timestamp including the date and the time of detection. In block 530, the machine agent may be contacted to obtain a full memory snapshot of the memory dump 112. As a non-limiting example, the rootkit server agent 104 contacts the rootkit client agent 102 and initiates the full memory snapshot. The memory dump 112 is compressed to form the memory snapshot in block 532 (for example, by using a compression algorithm such as 0.7z or RAR). Block 532 continues on to the block 534 of FIG. 5C as described below.

Upon determining that the stop code is driver related in block 522, the process 500 checks whether the driver is authorized in block 574. The memory dump 112 may be analyzed to check its object name against the application repository 110. If not (e.g., the driver is not authorized), the process 500 continues on to block 528 to generate the alert for the possible rootkit. If the driver is authorized in block 574, or if the stop code is not determine to be operating system related in block 524, the process 500 continues on to block 576 to determine whether the stop code is memory related by, for example, checking the stop code against the stop code repository 118 to determine whether it is related to a memory error. If not, the crash repository 120 is updated in block 580 and the process 500 ends. The crash repository 120 may be updated with the machine name, the memory dump 112, the hash, a date and time of the crash, the stop code and a related priority. If yes, the process 500 continues on to block 578 of FIG. 5C as described below.

Figure 5C:
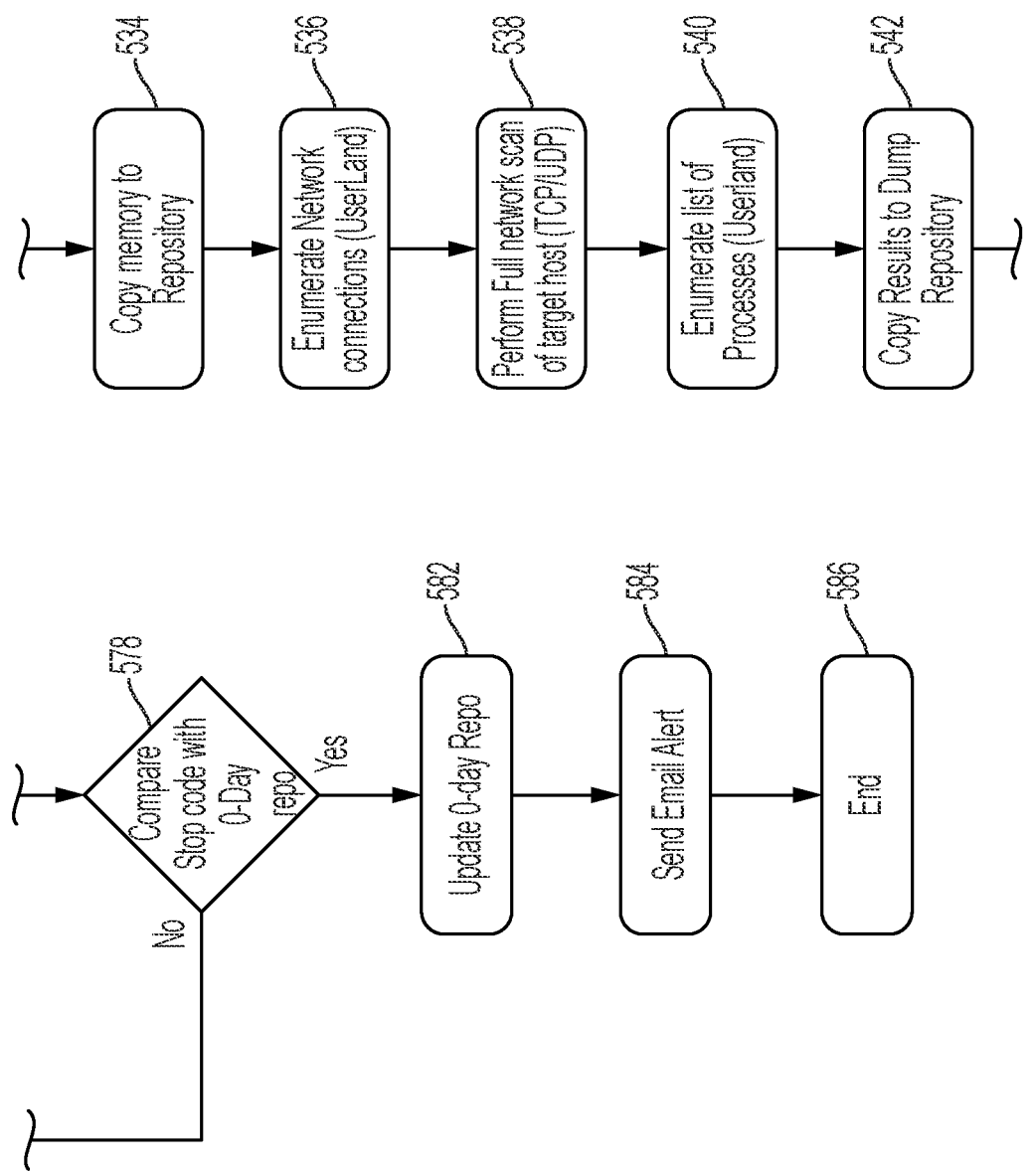
FIG. 5C illustrates a third part of the flowchart continuing from FIG. 5B.

Referring to FIG. 5C, a third part of the process 500 continuing from the second part of FIG. 5B is shown. In block 578, the stop code is compared with the 0-Day repository 116. The stop code may be checked against the 0-Day repository 116 for matching errors that can be exploited manually. Upon not finding a match, the crash repository 120 is updated in block 580 and the process 500 ends. The stop code repository 118 may be updated with the stop code when the stop code fails to match the existing stop code. Upon finding a match, the 0-Day repository 116 is updated in block 582, such as with the machine name, the memory dump 112, the hash, a date and time of the crash, the stop code and its priority. An email alert is generated and sent in block 584. The email alert may be sent to the dashboard 124 to indicate a memory dump 112 has been found that can be manually analyzed to create a 0-day listing or to inform a vendor. The process 500 ends in block 586.

If the process 500 was instead continuing from block 532 onto block 534 of FIG. 5C, the memory snapshot is copied to the dump repository 114 in block 534. In block 536, network connections are enumerated (e.g., in UserLand). The rootkit client agent 102 may enumerate all local Transmission Control Protocol (TCP) and User Datagram Protocol (UDP) ports in, for example, UserLand with elevated rights. In block 538, a full network scan of the target host (TCP/UDP) is performed. The rootkit server agent 104 may initiate a full TCP and UDP scan of the machine using the network scanner module 126 (e.g., using a tool such as NMAP). In block 540, a list of processes are enumerated (in UserLand), such that the rootkit server agent 104 may contact the rootkit client agent 102 to list all process in UserLand using elevated rights. In block 542, results (e.g., process lists and network lists) are copied to the dump repository 114 along with machine names and timestamps, and the process 500 continues on to block 544 of FIG. 5D as described below.

Figure 5D:
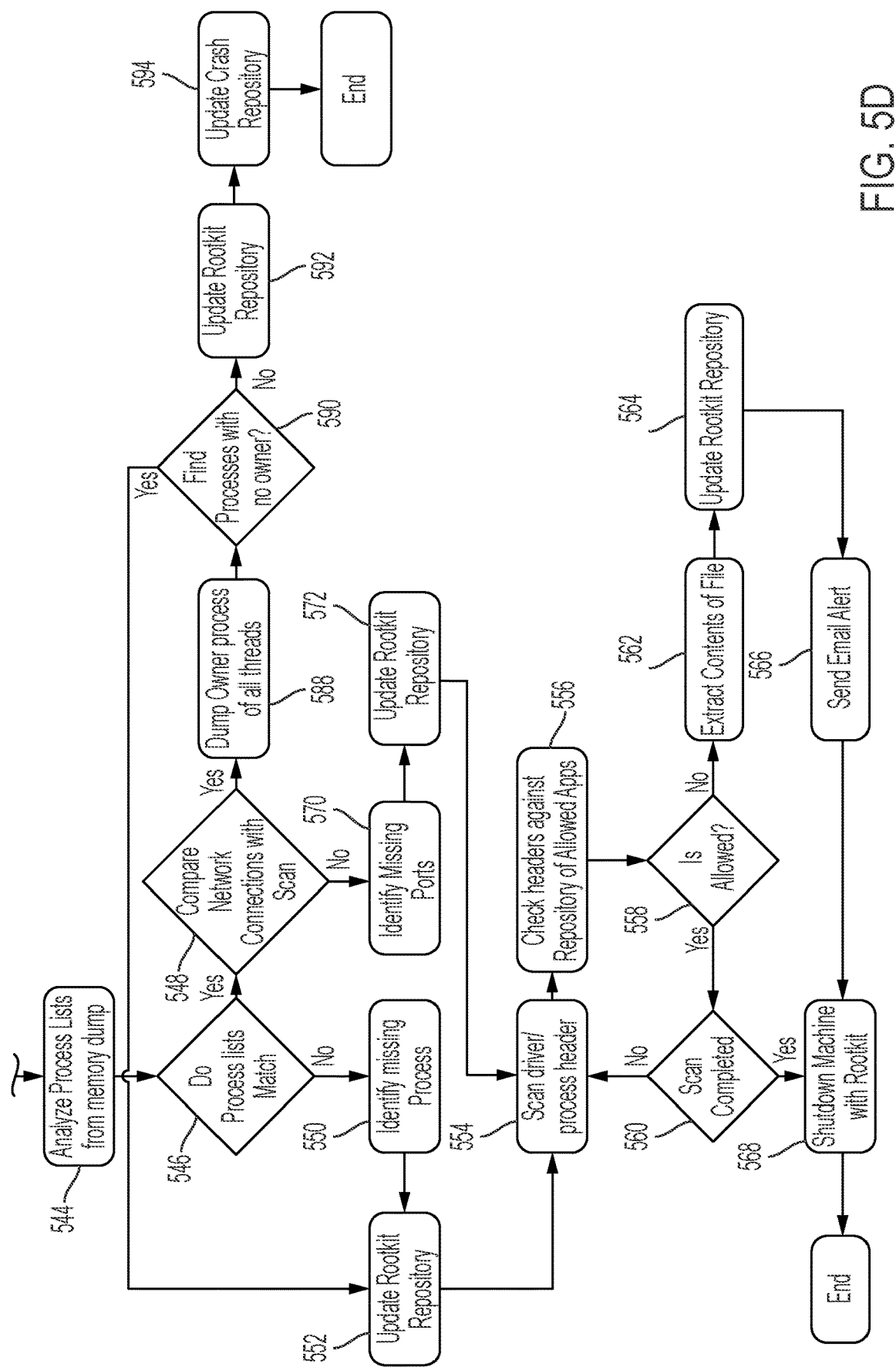
FIG. 5D illustrates a fourth part of the flowchart continuing from FIG. 5B.

Referring to FIG. 5D, a fourth part of the process 500 continuing from the third part of FIG. 5C is shown. In block 544, process lists from the memory dump 112 are analyzed. The memory dump 112 obtained from the rootkit client agent 102 may be analyzed for a list of running processes. In block 546, the process 500 determines whether the process lists match. A process list generated from UserLand by the rootkit client agent 102 may be compared to a list of processes enumerated from the memory snapshot to determine whether a number and a name of the processes match. If matching, the process 500 moves to block 548 described further below. If not matching, a missing process resulting from the failure to match is identified in block 550, such that the missing process is detected and its name, file location, and executable name may be extracted from the memory snapshot. The rootkit repository 115 is updated in block 552. The rootkit repository 115 may be updated with the machine name, the compressed memory snapshot, missing process name, file location, and executable name of the missing process. The driver/process header is scanned in block 554, such that a scan of the driver or process header may be conducted from the memory snapshot for identification. In block 556, the headers are checked against authorized applications (e.g., allowed headers) from the application repository 110. In block 558, if it is determined that the headers match authorized applications, the process 500 determines whether the scan is completed in block 560. If so, the machine with the rootkit is shutdown in block 568, and the process 500 ends. If not, the process 500 returns to block 554.

If it is determined in block 558 that the headers do not match authorized applications, the process 500 extracts contents of the unauthorized file in block 562. An unauthorized executable may be found and then extracted from the memory snapshot such as until another MZ header as understood by one of ordinary skill in the art is found. In block 564, the rootkit repository 115 is updated with those extracted contents and the unauthorized file. The rootkit repository 115 may be updated with machine name, extracted file/driver found, and a timestamp. In block 566, an email alert is sent of the update. The email alert may include details of the executable found, an associated priority level, and a timestamp. In block 568, the machine with the rootkit shuts down, and the process 500 ends. In block 568, the rootkit server agent 104 may instruct the rootkit client agent 102 to shut down all network activity to insure the positively identified rootkitted machine is isolated from the network 222.

If the process 500 determines that the process lists do match in block 546, network connections are compared with the scan to determine whether there is a match in block 548. The network list generated from the rootkit client agent 102 may be checked against the network scan conducted by the rootkit server agent 104 and compared to find a match. If not matching, missing ports from the failure to match are identified in block 570. In block 570, missing network TCP or UDP ports may be identified. The rootkit repository 115 is updated in block 572 with the missing ports. The rootkit repository 115 may be updated with the name of the machine, the missing port number, the date and time as a timestamp, and the source and destination of the network connection 106. The process 500 continues on to block 554. If matching, owner processes are dumped of all threads in block 588, such that the memory dump 112 may be used to enumerate owner processes of all threads. In block 590, a determination is made as to whether owner processes without an owner are identified. The threads may be searched to determine whether a thread does not have an owner. If so (e.g., no owner found), the rootkit repository 115 is updated with the identified processes without an owner in block 552 to continue onto block 554. If not (e.g., owner found), the rootkit repository 115 is updated in block 592 indicating the owner process includes owners. The rootkit repository 115 may be updated with a flag indicating that the processes and network lists match such that the crash was due to another cause (e.g., other than a rootkit). The crash repository 120 is updated in block 594 with, for example, machine name, the memory dump 112, the hash, the date and time of the crash as a timestamp, the stop code related to the crash, and a related priority level, and the process ends.

Figure 6:
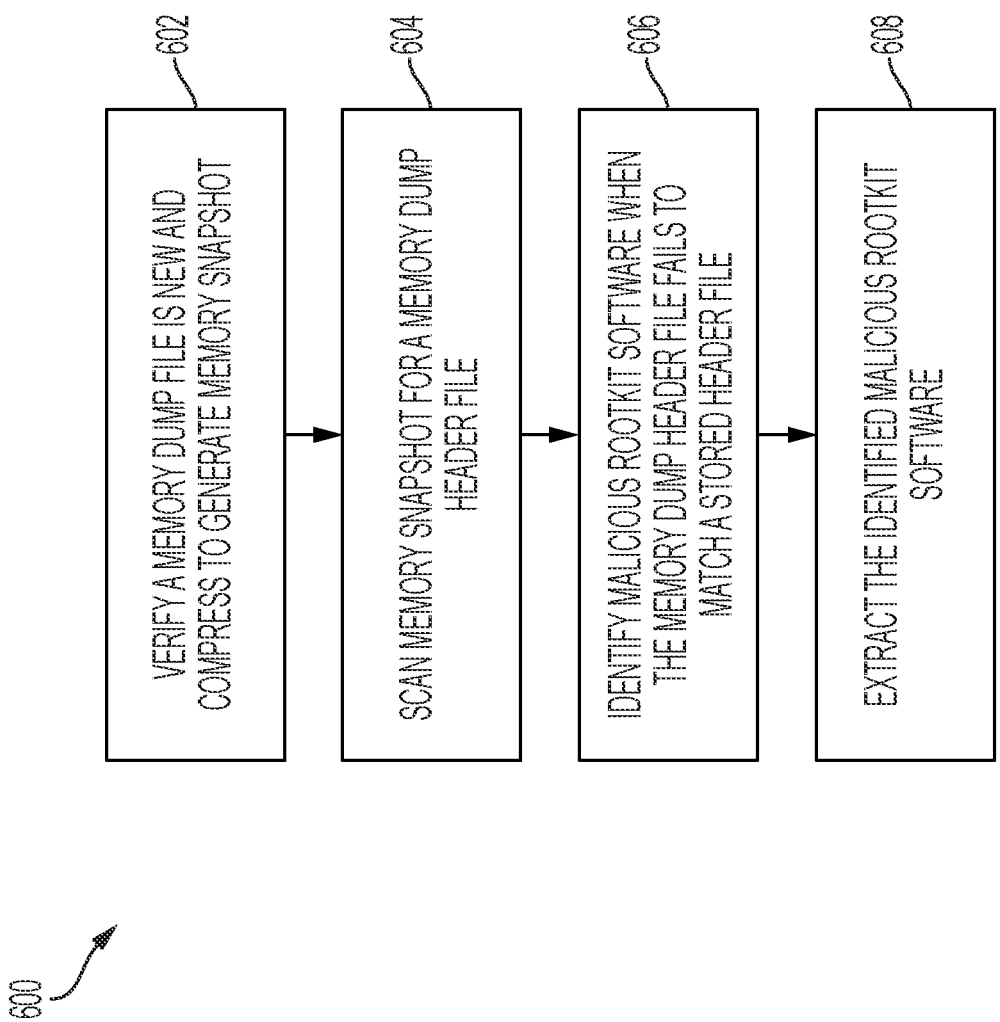
FIG. 6 illustrates a flowchart of a process to use with the rootkit detection system of FIG. 2, according to one or more embodiments shown and described herein.

Referring to FIG. 6, a process 600 is shown to use the rootkit detection system 200 for the operating system 125 to detect malicious software, the rootkit detection system 200 including the operating system memory 206 and an operating system data processor device 204. In embodiments, the operating system memory 206 includes the malicious software identification and extraction module 211 and the application software repository 110. The malicious software identification and extraction module 211 may include machine-readable instructions executable by the operating system data processor device 204. The application software repository 100 may include a stored header file associated with a software driver, an executable computer program, or both. The operating system data processor device 204 may be communicatively coupled to the operating system memory 206 and operable to execute the machine-readable instructions of the malicious software identification and extraction module 211 to perform one or more of the processes 300-600 described herein as one or more of the instructions.

In embodiments, the instructions may be to receive a memory dump file from a memory dump 112 upon a crash of the operating system 125, the memory dump file including a copy of the software driver, a copy of the executable computer program, or both. In block 602 of the process 600, the memory dump file may be verified as a new memory dump file for analysis as not matching a previous memory dump file as described herein. Further, the verified memory dump file is compressed to generate a memory snapshot of the verified memory dump file.

In block 604, the memory snapshot is scanned by the network scanner module 126 for a memory dump header file, which is associated with the copy of the software driver, the copy of the executable computer program, or both. In block 606, malicious software is identified when the memory dump header file from the memory snapshot fails to match at least one stored header file of a plurality of stored header files in the application software repository 110. In block 606, the identified malicious software is extracted from the operating system 125.

In embodiments, the malicious software identification and extraction module 211 is associated with the client agent 102, the server agent 104, or both, the client agent 102 being communicatively coupled to the server agent 104. When the malicious software identification and extraction module 211 is associated with the client agent 102, the server agent 104, or both, the operating system data processor device 204 may be operable to execute the machine-readable instructions of the malicious software identification and extraction module 211 via and on the client agent 102, the server agent 104, or both.

In an aspect, when the malicious software identification and extraction module 211 is associated with the client agent 102, the operating system data processor device 204 may be operable to execute the machine-readable instructions of the malicious software identification and extraction module 211 on the client agent 102. Corresponding to blocks 308 and 310 of FIG. 3, the operating system data processor device 204 may be further operable to execute the machine-readable instructions of the malicious software identification and extraction module 211 to compare a memory dump stop code from the memory dump file to a plurality of stored stop codes in the stop code repository 118, and perform a network scan via the network scanner module 126 of the client agent 102 to generate a plurality of scanned network connections 106 when the memory dump stop code fails to match at least one stored stop code of the plurality of stored stop codes in the stop code repository 118. Corresponding to blocks 312 and 316 of FIG. 3, the processor device 204 may be further operable to execute the machine-readable instructions of the module 211 to apply an enumeration function to the memory dump file to generate a list of enumerated processes, compare a plurality of stored kernel process lists 108 to the list of enumerated processes, and apply the enumeration function to a plurality of thread identifiers associated with a corresponding plurality of process identifiers from the list of enumerated processes. Corresponding to blocks 324 and 326 of FIG. 3, the processor device 204 may be also operable to execute the machine-readable instructions of the module 211 to identify an enumerated process that is invisible when the enumerated process fails to match at least a stored kernel process list 108 of the plurality of stored kernel process lists 108, identify the malicious software based on the enumerated process that is invisible, and generate an alert based on the identified malicious software. The stop code repository 118 may be disposed in the server agent 104 communicatively coupled to the client agent 102.

In embodiments, corresponding to at least blocks 314, 318, and 326 of FIG. 3, the operating system data processor device 204 is further operable to execute the machine-readable instructions of the malicious software identification and extraction module 211 to apply an enumeration function to the memory dump file to generate a list of enumerated network connections, compare the plurality of scanned network connections with the list of enumerated network connections, and update the rootkit repository 115 with an enumerated network connection indicative of a missing port when the enumerated network connection fails to match at least one scanned network connection of the plurality of scanned network connections 106. The rootkit repository 115 may be disposed in the server agent 104, the client agent 102, or both.

In embodiments, corresponding to at least blocks 402, 412, and 418 of FIGS. 4A-4B, the malicious software identification and extraction module 211 is associated with the client agent 102. The operating system data processor device 204 may be further operable to execute the machine-readable instructions of the malicious software identification and extraction module 211 to start the client agent 102 from a power off state, and generate an inventory upon starting the client agent 102 from the power off state. The inventory may include the software driver, the executable computer program, or both, and the stored header file. The stored header file of the inventory may be compared with the stored header file of the application software repository 110 to determine whether there is an inventory match such that, upon finding the inventory match, it is next determined whether the memory dump file matches an existing memory dump file. When the memory dump file matches the existing memory dump file, the process is ended.

Corresponding to blocks 404-410 of FIG. 4A, the operating system data processor device 204 is further operable to execute the machine-readable instructions of the malicious software identification and extraction module 211 to determine whether the start from the power off state was at an initial run time (e.g., a first time run), and generate the inventory when the start was at the initial run time. The inventory comprising the software driver, the executable computer program, or both, to store in the operating system memory 206. The stored header file associated with the software driver, the executable computer program, or both, from the inventory may be scanned with the network scanner module 126. The application software repository 110 may be updated with the stored header file, the initial run time, and file name and location of the software driver, the executable computer program, or both.

In embodiments, the operating system data processor device 204 is further operable to execute the machine-readable instructions of the malicious software identification and extraction module 211 to correspond with at least blocks 502, 504, 520, and 578 of FIGS. 5A-5D. As a non-limiting example, the module 211 may be operable to determine whether the memory dump file matches an existing memory dump file in a dump repository, generate a hash for the memory dump file when the memory dump file does not match the existing memory dump file, compare the hash against an existing hash in the dump repository to verify the memory dump file is new for analysis when the hash does not match the existing hash, and generate an alert for the server agent 104 communicatively coupled to the client agent 102 that the verified memory dump file is ready for analysis. The alert may include a stop code. The alert may be received at the server agent 104, which includes the stop code repository 118 including an existing stop code. The stop code repository 118 may be updated with the stop code when the stop code fails to match the existing stop code.

Referring again to FIG. 2, while only one server 220 and one computing device 224 is illustrated, the rootkit detection system 200 can comprise multiple servers containing one or more applications and computing devices. In some embodiments, the rootkit detection system 200 is implemented using a wide area network (WAN) or network 222, such as an intranet or the internet. The computing device 224 may include digital systems and other devices permitting connection to and navigation of the network 222. It is contemplated and within the scope of this disclosure that the computing device 224 may be a personal computer, a laptop device, a smart mobile device such as a smartphone or smart pad, or the like. Other rootkit detection system 200 variations allowing for communication between various geographically diverse components are possible. The lines depicted in FIG. 2 indicate communication rather than physical connections between the various components.

The rootkit detection system 200 comprises the communication path 202. The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the rootkit detection system 200. As used herein, the term "communicatively coupled" means that coupled components are capable of exchanging data signals with one another such as, for example, electrical signals via conductive medium, electromagnetic signals via air, optical signals via optical waveguides, and the like.

The rootkit detection system 200 of FIG. 2 also comprises the processor 204. The processor 204 can be any device capable of executing machine readable instructions. Accordingly, the processor 204 may be a controller, an integrated circuit, a microchip, a computer, or any other computing device. The processor 204 is communicatively coupled to the other components of the rootkit detection system 200 by the communication path 202. Accordingly, the communication path 202 may communicatively couple any number of processors with one another, and allow the modules coupled to the communication path 202 to operate in a distributed computing environment. Specifically, each of the modules can operate as a node that may send and/or receive data.

The illustrated rootkit detection system 200 further comprises the memory 206 which is coupled to the communication path 202 and communicatively coupled to the processor 204. The memory 206 may be a non-transitory computer readable medium or non-transitory computer readable memory and may be configured as a nonvolatile computer readable medium. The memory 206 may comprise RAM, ROM, flash memories, hard drives, or any device capable of storing machine readable instructions such that the machine readable instructions can be accessed and executed by the processor 204. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, as noted above, the rootkit detection system 200 comprises the display such as a graphical user interface (GUI) on a screen of the computing device 224 for providing visual output such as, for example, information, graphical reports, messages, or a combination thereof. The display on the screen of the computing device 224 is coupled to the communication path 202 and communicatively coupled to the processor 204. Accordingly, the communication path 202 communicatively couples the display to other modules of the rootkit detection system 200. The display can comprise any medium capable of transmitting an optical output such as, for example, a cathode ray tube, light emitting diodes, a liquid crystal display, a plasma display, or the like. Additionally, it is noted that the display or the computing device 224 can comprise at least one of the processor 204 and the memory 206. While the rootkit detection system 200 is illustrated as a single, integrated system in FIG. 2, in other embodiments, the systems can be independent systems.

The rootkit detection system 200 comprises the intelligent water cut measurement module 312 as described above, to at least apply data analytics and artificial intelligence algorithms and models to received input data, and the machine learning module 316 for providing such artificial intelligence algorithms and models. The machine learning module 316 may include an artificial intelligence component to train and provide machine learning capabilities to a neural network as described herein. By way of example, and not as a limitation, a convolutional neural network (CNN) may be utilized. The intelligent water cut measurement module 312 and the machine learning module 316 are coupled to the communication path 202 and communicatively coupled to the processor 204. As will be described in further detail below, the processor 204 may process the input signals received from the system modules and/or extract information from such signals.

The rootkit detection system 200 comprises the network interface hardware 218 for communicatively coupling the rootkit detection system 200 with a computer network such as network 222. The network interface hardware 218 is coupled to the communication path 202 such that the communication path 202 communicatively couples the network interface hardware 218 to other modules of the rootkit detection system 200. The network interface hardware 218 can be any device capable of transmitting and/or receiving data via a wireless network. Accordingly, the network interface hardware 218 can comprise a communication transceiver for sending and/or receiving data according to any wireless communication standard. For example, the network interface hardware 218 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 2, data from various applications running on computing device 224 can be provided from the computing device 224 to the rootkit detection system 200 via the network interface hardware 218. The computing device 224 can be any device having hardware (e.g., chipsets, processors, memory, etc.) for communicatively coupling with the network interface hardware 218 and a network 222. Specifically, the computing device 224 can comprise an input device having an antenna for communicating over one or more of the wireless computer networks described above.

The network 222 can comprise any wired and/or wireless network such as, for example, wide area networks, metropolitan area networks, the internet, an intranet, satellite networks, or the like. Accordingly, the network 222 can be utilized as a wireless access point by the computing device 224 to access one or more servers (e.g., a server 220). The server 220 and any additional servers generally comprise processors, memory, and chipset for delivering resources via the network 222. Resources can include providing, for example, processing, storage, software, and information from the server 220 to the rootkit detection system 200 via the network 222. Additionally, it is noted that the server 220 and any additional servers can share resources with one another over the network 222 such as, for example, via the wired portion of the network, the wireless portion of the network, or combinations thereof.

In an embodiment, the rootkit detection system 200 may include machine readable instructions stored in the memory 206 communicatively coupled to the processor 204 to implement a control scheme such as the processes 300, 400, 500, and 600 of FIGS. 3-6 as described herein.

Embodiments described herein are directed to systems and methods to automate the detection and mitigation of kernel rootkits of computer operating systems. Such rootkits may be difficult to detect as they subvert the kernels operating system and are able to hide their existence within a system. Some operating systems, such as Windows 10, may have a built-in feature that forces systems to crash (e.g., a stop code) and create a memory dump 112 if an anomaly is detected within the kernel architecture. Such a crash is often referred to as the blue screen of death (BSOD). The rootkit detection system 200 described herein has the ability to identify rootkits that are known to cause such crashes invoking BSODs and based on kernel errors. The rootkit detection system 200 is configured to analyze memory dumps 112 created by such BSODs and determine whether the cause of the crash was a rootkit as a malicious program while also being able to automatically extract the malicious program that is hiding.

Embodiments of the present disclosure are further configured to detect rootkits that do not have a corresponding signature that may be identified by cyber products. Such rootkits may otherwise remain hidden deep in an operating system without identification. The rootkit detection system 200 described in embodiments herein may scan the header of the device drivers and executables the first time they are installed and add them to a repository for further checking. This information may then be used to compare with what is found on a suspected machine with a rootkit and to compare the headers to new drivers found from a memory snapshot. The information may then be copied over to a central location (e.g., the server 220) so it can be used to authorize applications across a large network (e.g., the network 222). The rootkit detection system 200 further may also enumerate network ports while also conducting a network scan. The rootkit detection system 200 may parse a kernel structure to obtain the PIDs and use them as the initial process list for comparison to detect a rootkit as described herein, and further enumerates the processes from a userland agent and then compares them to what is in the memory dump 112. The rootkit detection system 200 may further compare PIDs by enumerating all threads to search for invisible owners as described herein, where hidden processes might not include such invisible owners. The rootkit detection system 200 as described herein is further not resource hungry and can be practically installed through a network 222 without causing slowdown of associated workstations or servers 220.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A rootkit detection system for an operating system to detect malicious software, the rootkit detection system comprising an operating system memory and an operating system data processor device, wherein:
    the operating system memory comprises a malicious software identification and extraction module and an application software repository;
    the malicious software identification and extraction module comprises machine-readable instructions executable by the operating system data processor device, wherein the malicious software identification and extraction module is associated with a client agent;
    the application software repository comprises a stored header file associated with a software driver, an executable computer program, or both; and
    the operating system data processor device is communicatively coupled to the operating system memory and is operable to execute the machine-readable instructions of the malicious software identification and extraction module to
        receive a memory dump file upon a crash of the operating system, the memory dump file comprising a copy of the software driver, a copy of the executable computer program, or both,
        determine whether the memory dump file matches an existing memory dump file in a dump repository,
        generate a hash for the memory dump file when the memory dump file does not match the existing memory dump file,
        verify the memory dump file is new for analysis via comparing the hash against an existing hash in the dump repository to verify the memory dump file is new for analysis when the hash does not match the existing hash,
        generate an alert for a server agent communicatively coupled to the client agent that the verified memory dump file is ready for analysis, the alert comprising a stop code,
        receive the alert at the server agent comprising a stop code repository, the stop code repository comprising an existing stop code,
        update the stop code repository with the stop code when the stop code fails to match the existing stop code,
        compress the verified memory dump file to generate a memory snapshot of the verified memory dump file,
        scan the memory snapshot for a memory dump header file, the memory dump header file being associated with the copy of the software driver, the copy of the executable computer program, or both, and
        identify and extract malicious software when the memory dump header file from the memory snapshot fails to match at least one stored header file in the application software repository.

2. The rootkit detection system of claim 1, wherein the malicious software identification and extraction module is associated with the client agent, a server agent, or both, wherein the client agent is communicatively coupled to the server agent.

3. The rootkit detection system of claim 1, wherein the malicious software identification and extraction module is associated with the client agent, a server agent, or both, and the operating system data processor device is operable to execute the machine-readable instructions of the malicious software identification and extraction module on the client agent, the server agent, or both.

4. The rootkit detection system of claim 1, wherein the malicious software identification and extraction module is associated with the client agent, and the operating system data processor device is operable to execute the machine-readable instructions of the malicious software identification and extraction module on the client agent.

5. The rootkit detection system of claim 4, wherein the operating system data processor device is further operable to execute the machine-readable instructions of the malicious software identification and extraction module to
    compare a memory dump stop code from the memory dump file to a plurality of stored stop codes in a stop code repository;
    perform a network scan of the client agent to generate a plurality of scanned network connections when the memory dump stop code fails to match at least one stored stop code of the plurality of stored stop codes in the stop code repository;
    apply an enumeration function to the memory dump file to generate a list of enumerated processes;
    compare a plurality of stored kernel process lists to the list of enumerated processes;
    apply the enumeration function to a plurality of thread identifiers associated with a corresponding plurality of process identifiers from the list of enumerated processes;
    identify an enumerated process that is invisible when the enumerated process fails to match at least a stored kernel process list of the plurality of stored kernel process lists; and
    identify the malicious software based on the enumerated process that is invisible; and
    generate an alert based on the identified malicious software.

6. The rootkit detection system of claim 5, wherein the stop code repository is disposed in a server agent, the server agent communicatively coupled to the client agent.

7. The rootkit detection system of claim 4, wherein the operating system data processor device is further operable to execute the machine-readable instructions of the malicious software identification and extraction module to
    apply an enumeration function to the memory dump file to generate a list of enumerated network connections;
    compare a plurality of scanned network connections with the list of enumerated network connections; and
    update a rootkit repository, a 0-Day repository, or both with (i) an enumerated network connection indicative of a missing port when the enumerated network connection fails to match at least one scanned network connection of the plurality of scanned network connections, (ii) the identified malicious software indicative of discovery of a vulnerability in an application code of an application of the operating system based upon the crash, or (iii) both.

8. The rootkit detection system of claim 7, wherein the rootkit repository is disposed in a server agent, the client agent, or both, and the server agent is communicatively coupled to the client agent.

9. The rootkit detection system of claim 1, wherein the operating system data processor device is further operable to execute the machine-readable instructions of the malicious software identification and extraction module to
　start the client agent from a power off state;
　generate an inventory upon starting the client agent from the power off state, the inventory comprising the software driver, the executable computer program, or both, and the stored header file;
　compare the stored header file of the inventory with the stored header file of the application software repository to determine whether there is an inventory match;
　determine whether the memory dump file matches an existing memory dump file upon finding the inventory match; and
　end process when the memory dump file matches the existing memory dump file.

10. The rootkit detection system of claim 9, wherein the operating system data processor device is further operable to execute the machine-readable instructions of the malicious software identification and extraction module to
　determine whether the start from the power off state was at an initial run time;
　generate the inventory when the start was at the initial run time, the inventory comprising the software driver, the executable computer program, or both, to store in the operating system memory;
　scan the stored header file associated with the software driver, the executable computer program, or both, from the inventory; and
　update the application software repository with the stored header file, the initial run time, and file name and location of the software driver, the executable computer program, or both.

11. A rootkit detection system for an operating system to detect malicious software, the rootkit detection system comprising an operating system memory and an operating system data processor device, wherein:
　the operating system memory comprises a malicious software identification and extraction module and an application software repository;
　the malicious software identification and extraction module comprises machine-readable instructions executable by the operating system data processor device, the malicious software identification and extraction module associated with a client agent, a server agent, or both, wherein the client agent is communicatively coupled to the server agent;
　the application software repository comprises a stored header file associated with a software driver, an executable computer program, or both; and
　the operating system data processor device is communicatively coupled to the operating system memory and is operable to execute the machine-readable instructions of the malicious software identification and extraction module to
　　receive a memory dump file upon a crash of the operating system, the memory dump file comprising a copy of the software driver, a copy of the executable computer program, or both,
　　verify the memory dump file is new for analysis by (i) determination of whether the memory dump file matches an existing memory dump file in a dump repository and (ii) generation of a hash for the memory dump file when the memory dump file does not match the existing memory dump file, the hash being indicative of a verified memory dump file new for analysis,
　　compress the verified memory dump file to generate a memory snapshot of the verified memory dump file,
　　scan the memory snapshot for a memory dump header file, the memory dump header file being associated with the copy of the software driver, the copy of the executable computer program, or both, and
　　identify and extract malicious software when the memory dump header file from the memory snapshot fails to match at least one stored header file in the application software repository.

12. The rootkit detection system of claim 11, wherein the malicious software identification and extraction module is associated with the client agent, and the operating system data processor device is operable to execute the machine-readable instructions of the malicious software identification and extraction module on the client agent.

13. The rootkit detection system of claim 12, wherein the malicious software identification and extraction module is associated with the client agent, and the operating system data processor device is operable to execute the machine-readable instructions of the malicious software identification and extraction module on the client agent, and the operating system data processor device is further operable to execute the machine-readable instructions of the malicious software identification and extraction module to
　compare a memory dump stop code from the memory dump file to a plurality of stored stop codes in a stop code repository;
　perform a network scan of the client agent to generate a plurality of scanned network connections when the memory dump stop code fails to match at least one stored stop code of the plurality of stored stop codes in the stop code repository;
　apply an enumeration function to the memory dump file to generate a list of enumerated processes;
　compare a plurality of stored kernel process lists to the list of enumerated processes;
　apply the enumeration function to a plurality of thread identifiers associated with a corresponding plurality of process identifiers from the list of enumerated processes;
　identify an enumerated process that is invisible when the enumerated process fails to match at least a stored kernel process list of the plurality of stored kernel process lists;
　identify the malicious software based on the enumerated process that is invisible; and
　generate an alert based on the identified malicious software.

14. The rootkit detection system of claim 12, wherein the operating system data processor device is further operable to execute the machine-readable instructions of the malicious software identification and extraction module to
　apply an enumeration function to the memory dump file to generate a list of enumerated network connections;
　compare a plurality of scanned network connections with the list of enumerated network connections; and
　update a rootkit repository, a 0-Day repository, or both with (i) an enumerated network connection indicative of a missing port when the enumerated network connection fails to match at least one scanned network connection of the plurality of scanned network connections, (ii) the identified malicious software indicative of discovery of a vulnerability in an application code of an application of the operating system based upon the crash, or (iii) both.

15. The rootkit detection system of claim 11, wherein the malicious software identification and extraction module is associated with the client agent, and the operating system data processor device is further operable to execute the machine-readable instructions of the malicious software identification and extraction module to
- start the client agent from a power off state;
- generate an inventory upon starting the client agent from the power off state, the inventory comprising the software driver, the executable computer program, or both, and the stored header file;
- compare the stored header file of the inventory with the stored header file of the application software repository to determine whether there is an inventory match;
- determine whether the memory dump file matches the existing memory dump file upon finding the inventory match; and
- end process when the memory dump file matches the existing memory dump file.

16. The rootkit detection system of claim 15, wherein the operating system data processor device is further operable to execute the machine-readable instructions of the malicious software identification and extraction module to
- determine whether the start from the power off state was at an initial run time;
- generate the inventory when the start was at the initial run time, the inventory comprising the software driver, the executable computer program, or both, to store in the operating system memory;
- scan the stored header file associated with the software driver, the executable computer program, or both, from the inventory; and
- update the application software repository with the stored header file, the initial run time, and file name and location of the software driver, the executable computer program, or both.

17. The rootkit detection system of claim 11, wherein the malicious software identification and extraction module is associated with the client agent, and the operating system data processor device is further operable to execute the machine-readable instructions of the malicious software identification and extraction module to
- compare the hash against an existing hash in the dump repository to verify the memory dump file is new for analysis when the hash does not match the existing hash;
- generate an alert for the server agent communicatively coupled to the client agent that the verified memory dump file is ready for analysis, the alert comprising a stop code;
- receive the alert at the server agent comprising a stop code repository, the stop code repository comprising an existing stop code; and
- update the stop code repository with the stop code when the stop code fails to match the existing stop code.

18. A method for using a rootkit detection system for an operating system to detect malicious software, the rootkit detection system comprising an operating system memory and an operating system data processor device, the operating system memory comprising an application software repository comprising a stored header file associated with a software driver, an executable computer program, or both, the method comprising:
- receiving a memory dump file upon a crash of the operating system, the memory dump file comprising a copy of the software driver, a copy of the executable computer program, or both;
- verifying the memory dump file is new for analysis;
- compressing the verified memory dump file to generate a memory snapshot of the verified memory dump file;
- scanning the memory snapshot for a memory dump header file, the memory dump header file being associated with the copy of the software driver, the copy of the executable computer program, or both;
- identifying and extracting malicious software when the memory dump header file from the memory snapshot fails to match at least one stored header file in the application software repository;
- comparing a memory dump stop code from the memory dump file to a plurality of stored stop codes in a stop code repository;
- performing a network scan of a client agent to generate a plurality of scanned network connections when the memory dump stop code fails to match at least one stored stop code of the plurality of stored stop codes in the stop code repository;
- applying an enumeration function to the memory dump file to generate a list of enumerated processes;
- comparing a plurality of stored kernel process lists to the list of enumerated processes;
- applying the enumeration function to a plurality of thread identifiers associated with a corresponding plurality of process identifiers from the list of enumerated processes;
- identifying an enumerated process that is invisible when the enumerated process fails to match at least a stored kernel process list of the plurality of stored kernel process lists;
- identifying the malicious software based on the enumerated process that is invisible; and
- generating an alert based on the identified malicious software.

* * * * *